June 12, 1962 W. HENNY ET AL 3,038,697
GAS TURBINE ADJUSTABLE NOZZLE AND INTERSTAGE
INNER SHROUD SUSPENSION
Filed July 5, 1960 2 Sheets-Sheet 1

INVENTORS.
Willi Henny
Giovanni F. Savonuzzi
Robert A. Mendelsohn
BY Harness & Harris
ATTORNEYS June 12, 1962  W. HENNY ET AL  3,038,697
GAS TURBINE ADJUSTABLE NOZZLE AND INTERSTAGE
INNER SHROUD SUSPENSION
Filed July 5, 1960  2 Sheets-Sheet 2
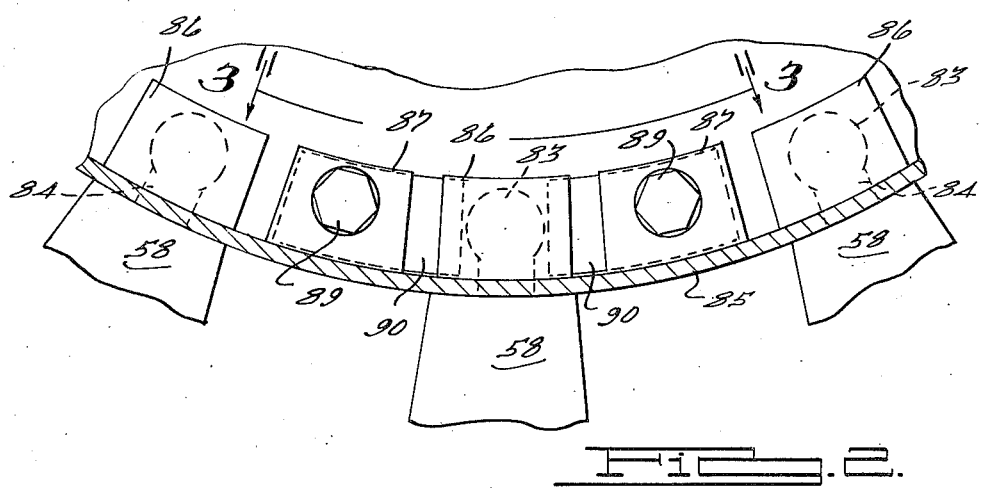
FIG. 2.
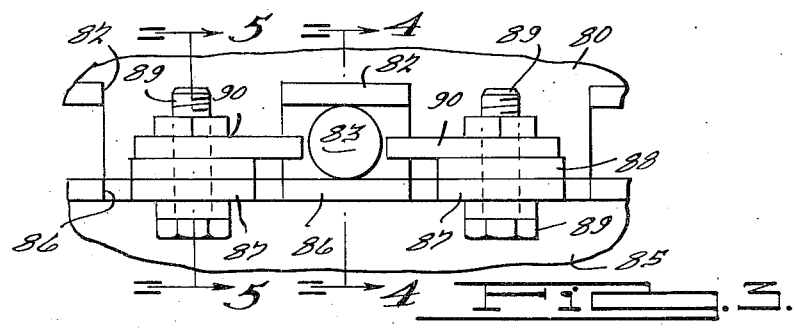
FIG. 3.
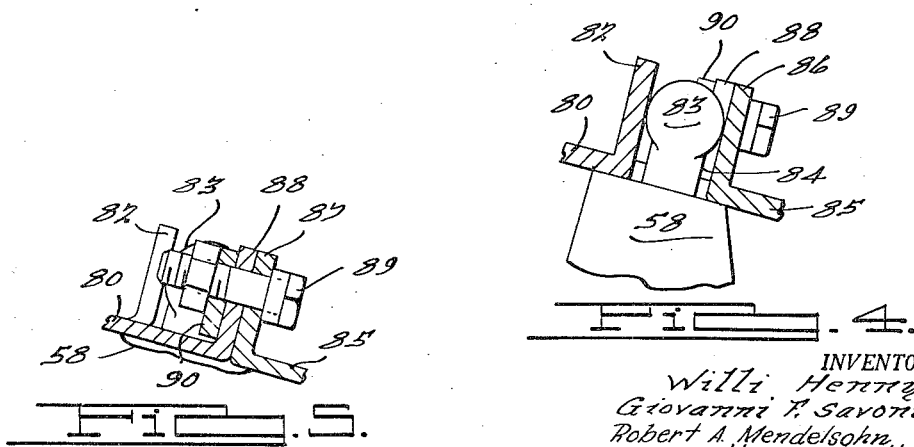
FIG. 5.
FIG. 4.
INVENTORS.
Willi Henny.
Giovanni T. Savonuzzi.
Robert A. Mendelsohn.
BY Harness & Harris
ATTORNEYS.

3,038,697
GAS TURBINE ADJUSTABLE NOZZLE AND INTER-
STAGE INNER SHROUD SUSPENSION
Willi Henny, Southfield, Giovanni F. Savonuzzi, Birmingham, and Robert A. Mendelsohn, Detroit, Mich., assignors to Chrysler Corporation, Highland Park, Mich., a corporation of Delaware
Filed July 5, 1960, Ser. No. 40,951
10 Claims. (Cl. 253—39)

This invention relates to a multiple stage gas turbine engine and in particular to the annular passage for conducting motive gases between the first and second stage rotors of such an engine.

In a common type of gas turbine automobile engine, an annular conduit comprising inner and outer shrouds conveys hot motive gases to the peripheral blades of first and second coaxial rotor stages to drive the same. Within the conduit immediately upstream of the blades of the second stage rotor are a plurality of circumferentially arranged adjustable nozzles for adjusting the angle of attack of the gases against the rotor blades. Reference may be had to Huebner et al. Patent 2,795,928 for details of a gas turbine engine of the type with which the present invention is concerned.

Among the problems involved in the satisfactory production of such an engine is the provision of a feasible interstage inner shroud section and means for supporting the same between the first and second rotor stages so as to effect a minimum encumbrance to the flow of motive gases. Heretofore the interstage inner shroud section has been supported by struts or fixed blades interconnecting the inner and outer shrouds. Such supports are costly to assemble and impede the flow of motive gases. In applications where fixed interstage blades are unnecessary, the use of such blades are particularly objectionable.

An important object of the present invention is therefore to provide an improved highly efficient interstage inner shroud section and support therefor in a gas turbine engine which avoids the above problems and which is particularly simple and economical to manufacture and assemble.

Another and more specific object is to provide a two-stage gas turbine engine of the above character which is suitable for automotive use wherein the adjustable nozzles are supported by the outer shroud for rotation about an axis transverse to the axis of the coaxial rotor stages and annular gas passage. The inner end of each nozzle carries a ball element for supporting the interstage inner shroud section by means of flanges of the latter resiliently engaging opposite sides of the ball elements. Thus the shroud flanges resiliently grip the plurality of ball elements at locations spaced around the periphery of the inner shroud section. Any slight variation in the resilient contact between the various ball elements and the flanges are averaged out around the circumference of the shroud and rendered inconsequential.

Another object is to provide such a structure wherein each ball element is spaced from the inner end of its associated nozzle by means of a stem extending inwardly from the inner end of the nozzle coaxially with the latter's axis of adjustable rotation, and wherein the inner shroud section comprises two annular parts arranged coaxially end to end. The juxtaposed ends of the annular shroud parts terminate in mating inturned flanges suitably secured together at circumferentially spaced locations between successive ball elements. At the regions of the ball elements, the two annular inner shroud parts are provided with inturned flanges resiliently engaging axially opposite sides of the ball elements to support the inner shroud section. By virtue of such a construction, the juxtaposed edges of the two annular shroud parts are readily arranged in axial alignment to enable unobstructed flow for the motive gases in the annular passage. The stems connecting the nozzles and ball elements space the latter inwardly from the comparatively unyieldable annular wall portions of the inner shroud section in position to be gripped by resiliently yieldable inner portions of the flanges.

Another object is to provide such a structure wherein the upstream part of the inner shroud section comprises a dished member closed at its upstream end by a baffle which both reinforces the upstream end of the dished part and prevents axial flow of the motive gases within the inner shroud section.

Still another object is to provide such a construction wherein both sets of the inturned flanges of the first part of the inner shroud section which engage the ball elements and also which are secured to the mating flanges of the second part of the inner shroud section extend side-by-side in circular alignment with the circular line of contact with said ball elements. The set of flanges of the second part of the inner shroud section which engage the ball elements are offset axially from the other set of flanges of the last-named part which are secured to the mating flanges of the first shroud part. Accordingly fabrication and assembly of the structure are facilitated and there is no necessity for using axial spacers between the mating flanges which are secured together at locations between the ball elements.

Other objects of this invention will appear in the following description and appended claims, reference being had to the accompanying drawings forming a part of this specification wherein like reference characters designate corresponding parts in the several views.

FIGURE 2 is a fragmentary enlarged transverse sectional view taken in the direction of the arrows substantially along the line 2—2 of FIGURE 1.

FIGURE 3 is a view taken in the direction of the arrows substantially along the arcuate line 3—3 of FIGURE 2.

FIGURE 4 is a fragmentary sectional view taken in the direction of the arrows substantially along the line 4—4 of FIGURE 3.

FIGURE 5 is a fragmentary sectional view taken in the direction of the arrows substantially along the line 5—5 of FIGURE 3.

Figure 1:
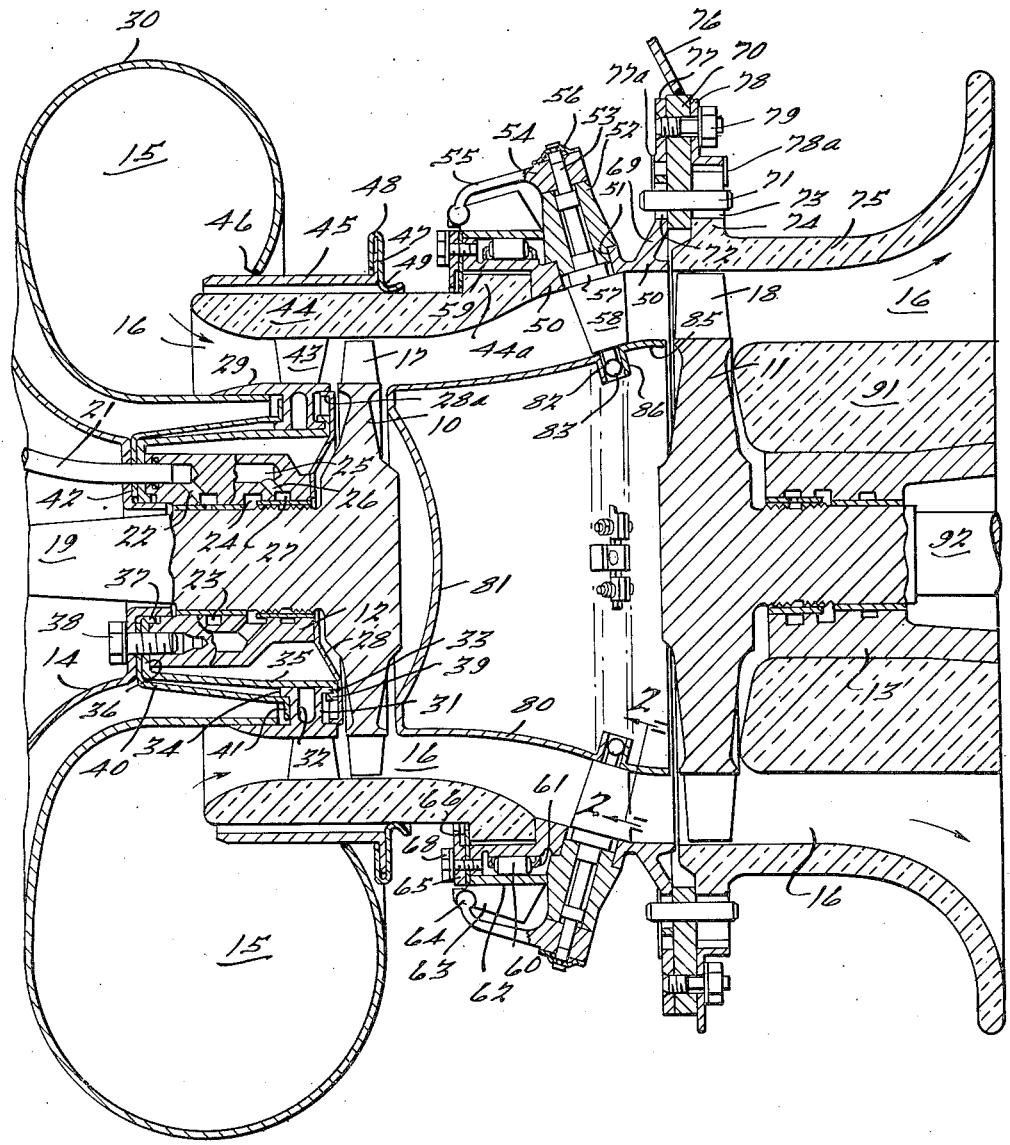
FIGURE 1 is a fragmentary mid-sectional view through a two-stage gas turbine engine embodying the present invention, taken along the common axis of the engine's rotors.

It is to be understood that the invention is not limited in its application to the details of construction and arrangement of parts illustrated in the accompanying drawings, since the invention is capable of other embodiment and of being practiced or carried out in various ways. Also it is to be understood that the phraseology or terminology employed herein is for the purpose of description and not of limitation.

Referring to the drawings, a gas turbine engine embodying the present invention is illustrated by way of example comprising first and second stage rotors 10 and 11 respectively, mounted coaxially in bearing supports 12 and 13 which in turn are suitably mounted in and supported by fixed portions of the engine structure including the sheet metal compressor turbine support 14, but not otherwise illustrated in detail. A typical automotive gas turbine engine of the type with which the present invention is concerned is illustrated in detail in the aforesaid Huebner et al. patent, it being sufficient to state herein that pressurized combustion supporting air is discharged from an engine driven compressor, preheated by a regenerator, admixed with fuel which is burned in a combustion chamber to supply the driving energy, and then conveyed into a collection chamber 15 from which the hot motive gases are discharged into an annular gas passage 16 defined by inner and outer shrouds described in more detail below. The motive gases flow through passage 16 in the direction of the arrows past the blades 17 and 18 of the rotors 10 and 11 respectively to drive the same and are thence discharged to a regenerator which transfers the usable remaining exhaust heat from the exhaust gases to the inlet combustion supporting air.

In the present instance, the first stage rotor 10 is mounted on a coaxial shaft 19 journalled in the bearing support 12 and operably connected with a compressor for supplying the aforesaid inlet air. A lubricating conduit 21 carries pressurized lubricating fluid into support 12 and thence via duct 22 to an annular oil inlet groove 23 adjacent the bearing structure of support 12 to lubricate the bearing for shaft 19. An oil return groove 24 associated with the bearing structure for shaft 19 collects the lubricating oil and discharges the same to a reservoir by conduit means similar to duct 21.

Similarly, pressurized cooling air is conveyed by duct 25 into support 12 and thence by branch duct 26 to an annular air inlet groove 27, from which the cooling air flows axially along shaft 19 toward rotor 10, through the central opening of an annular sealing plate 28 and thence radially outwardly between the latter and rotor 10 to the annular passage 16. Plate 28 is suitably secured to support 12. Thus the heat which tends to flow radially inward in rotor 10 from the blades 17 exposed to the hot motive gases is dissipated to prevent undue thermal distortion of the rotor.

Immediately upstream of the first stage rotor blades 17 is an annular inner shroud section 29 comprising a plurality of circumferentially extending segments which overlap a juxtaposed portion of the sheet metal closure 30 defining chamber 15. The downstream edge of the inner shroud section 29 overlaps an end flange 28a of plate 28 in fluid sealing relationship. Each segment of the shroud section 29 is provided with a pair of radially inwardly extending legs 31 and 32 having footings 33 and 34 respectively, supported by a conically shaped support 35. The smaller left end of support 35 terminates in an annular inturned base 36 which in turn terminates in an axially directed annular flange 37 seated within a mating locating notch in support 12. A plurality of bolts 38 screwed into support 12 through the base 36 secure the support 35 in position. The large or right end of conical support 35 terminates in an outturned and reversely bent annular hook portion 39 which extends closely around the footings 33 of the legs 31 to retain the latter and shroud section 29 firmly in position. An outer conical support 40 tightly overlies the footings 34 of legs 32 to hold the latter snugly against support 35 and terminates in an annular outturned flange 41. The radially outer edge of flange 41 resiliently engages the footings 32 in fluid sealing relation and urges the footings 33 axially into seated engagement with the hook portion 39. The smaller end of conical support 40 terminates in an annular inbent flange 42 overlapping the base 36 and secured against the latter by the bolts 38.

Integral with the segments of the inner shroud section 29 are a plurality of fixed nozzles 43 arranged in circumferentially spaced relationship within the annular passage 16. An annular ceramic outer shroud section 44 is supported on the outer ends of the blades 43 and is provided with an annular radial enlargement 44a at its downstream end. A sleeve 45 of slightly greater diameter than the outer circumference of shroud 44 extends coaxially around the latter and is secured as for example by welding at 46 to the closure 30. The downstream edge of sleeve 45 terminates in a radial annular flange 47 confined in fluid sealing engagement within an annular resilient channel seal 48 having an annular sealing portion 49 resiliently engaging the outer surface of shroud 44 to effect a fluid seal therewith.

Closely abutting the downstream edge of shroud 44 is an annular outer shroud section 50 of suitable heat resistant metal which is suitably supported by fixed portions of the engine structure. Extending perpendicularly to the inner surface of the outer shroud section 50 and uniformly spaced around its circumstance are a plurality of bores 51 for a corresponding plurality of bushings 52. The radial inner ends of the latter are suitably secured within their respective bores 51, as for example by being brazed or press fitted into position. Extending through each bushing 52 and journalled therein for rotation coaxially with the corresponding bore 51 is a spindle 53 having its radially outer end keyed to the hub 54 of a swinging arm 55. A spring 56 secured within a groove at the outer end of each spindle 53 resiliently urges each hub 54 against the outer end of the associated bushing 52 and simultaneously yieldingly urges the spindle 53 outwardly. The lower end of each spindle 53 is provided with an annular enlargement 57 which seats against the adjacent inner end of the bushing 52 to provide an annular fluid seal around the lower end of the spindle 53, thereby to prevent flow of gases from passage 16 between the enlargement 57 and bushing 52 and thence outwardly along spindle 53. Inwardly of each enlargement 57 is an adjustable nozzle blade 58 which projects into the annular passage 16 immediately upstream of the rotor blades 18. By rotating the nozzle blades 58 about the axes of their respective spindles 53, the angle of attack of the motive gases in passage 16 against the blades 18 can be predetermined.

Integral with the shroud section 50 is a cylindrical roller support 59 on which ride a plurality of circumferentially spaced rollers 60. The latter are maintained in spaced relationship by means of a circular cage 61 around the cylindrical support 59 and loosely confining the rollers 60. Journalled on the rollers 60 is a rotatable adjustable sleeve 62 having a plurality of circumferentially spaced plates 63 extending radially from its outer surface in axial planes. The plates 63 are provided in pairs, each pair confining the ball end 64 of one of each of the arms 55 therebetween, so that upon rotation of sleeve 62, the ball ends of the arms 55 are moved to pivot the spindles 53 about their axes and thereby to rotatably adjust all the nozzles 58 simultaneously.

The sleeve 62 is retained against axial movement by the bushings 52 at one edge and a retaining assembly at the opposite edge. The retaining assembly includes an annular plate 65 secured in place by a plurality of bolts 68 screwed into an integral portion of the shroud section 50 at the left edge of the cylindrical support 59. A resilient annular disc 66 interposed between plate 65 and the last-named portion of shroud section 50 overlaps the shoulder at the left edge of the enlargement 44a to confine the outer shroud section 44 yieldingly against axial movement while at the same time enabling its limited radial adjustment to accommodate for mechanical thermal distortion of the engine housing by way of example. To this end, the inner portion of the plate 65 overlapping shoulder 44a is spaced slightly from the resilient disc 66.

The outer shroud section 50 is also provided with a radial flange 69 which abuts an annular bulkhead flange 70 in sealing relation. The flange 70 is arranged coaxially with the axis of rotors 10 and 11 and locates the flange 69 coaxially therewith by means of at least three axially extending dowels 71 secured to flange 70 at uniformly spaced locations around the latter and extending snugly into radial slots 72 in the flange 69. The foregoing structure thus accommodates relative thermal expansion between the hot shroud section 50 and the comparatively cooler flange 70 while at the same time maintaining these members in coaxial relationship.

Similarly, the axial dowels 71 extend snugly through radial slots 73 in the annular flange 74 of an annular ceramic terminal outer shroud section 75 to maintain the latter in coaxial alignment with shourd section 50 and flange 70 while permitting relative thermal expansion between the latter and the shroud section 75. Flange 70 comprises part of the engine's fixed structure and is secured to the engine housing by a bulkhead 76. Annular flanges 77 and 78 are secured to opposite sides of flange 70 by bolts 79, the inner edges of the flanges 77 and 78 being suitably secured to resilient annular spring retainers 77a and 78a respectively, which overlie the peripheral edges of the flanges 69 and 74 respectively to hold the latter snugly against flange 70 in fluid sealing relation to prevent leakage of the motive gases between the flange 70 and juxtaposed portions of the flanges 69 and 74.

Arranged between the rotors 10 and 11 is a two-part interstage inner shroud section including a downstream cup-shaped portion having an annular inner shroud part 80 closed at its downstream end by a cup base 81. As illustrated in FIGURES 3, 4, and 5, a plurality of circumferentially spaced flanges 82 are directed inwardly from adjacent the downstream edge of the shroud part 80, each flange 82 resiliently engaging a side of one of each of a plurality of ball elements 83. Each ball element 83 is integrally secured to the inner end of one of each of the adjustable nozzles 58 by means of an inwardly extending shank 84 coaxial with the axis of rotation of the spindle 53.

The second portion of the interstage inner shroud section comprises an annular part 85 terminating at its downstream edge in a plurality of circumferentially spaced inturned flanges 86 resiliently engaging the balls 83 in opposition to the flanges 82. Alternating with the flanges 86 are a plurality of inturned flanges 87 of the shroud part 85, the flanges 87 mating with parallel inturned flanges 88 of the upstream edge of the interstage inner shroud part 80 and being secured thereto by a plurality of bolt and nut assemblies 89, FIGURE 3.

In order to assure proper alignment of the outer circumferential surfaces of the shroud parts 80 and 85, at least three of the bolts in the assemblies 89 are machined to fit precisely within the holes in the flanges 87 and 88 through which they pass. Also to prevent rotational movement of the shroud section 80, 85 with respect to the ball elements 83 and to maintain the latter located between the resilient flanges 82 and 86, a few sets of spacers 90 secured in position by the nut and bolt assemblies 89 at uniformly spaced locations around the shroud section 80, 85 are provided with extensions directed toward opposite sides of the adjacent ball elements 83, FIGURE 3. The flanges 82 and 86 extend in parallelism with the axis of rotation of the spindle 53 of the associated ball element 83 and resiliently grip the latter therebetween to hold the inner shroud section 80, 85 in position. By virtue of the plurality of ball elements 83 spaced uniformly around the axis of the passage 16, a substantially uniform supporting force around the circumference of the shroud section 80, 85 is applied thereto to maintain the latter in position, slight deviations in the resilient force of the flanges 82 and 86 against the balls 83 being averaged out and rendered inconsequential. The flanges 86 and 87 extend in a conical surface along the circular line of contact between the ball elements 83 and flanges 86, and parallel to the conical plane through the axes of the several spindles 53, thereby to simplify the structure of the downstream interstage shroud part 85. By virtue of the stems 84 spacing the ball elements 83 inwardly from the nozzles 58, the ball elements 83 are located in contact with the resiliently yieldable inner ends of the flanges 82 and 86 and sufficiently inwardly of the annular shroud parts 80 and 85 to prevent buckling of the latter regardless of the strong clamping engagement between the ball elements and the flanges 82 and 86.

Downstream of rotor 11, the inner shroud for the passage 16 is completed by an annular ceramic shroud section 91 suitably secured in position on the bearing support 13. The rotor 11 is provided with a shaft 92 journailed within the support 13 and operably connected with the vehicle wheels to drive the same. The lubrication and air cooling of rotor 11 and its bearing structure is essentially the same as for rotor 10 and is accordingly not described in detail.

In accordance with the structure shown, the outer shroud sections 44, 50 and 75 form a continuous annular outer wall for the passage 16. The inner shroud sections 29 and 80 extend in juxtaposition with the upstream and downstream edges respectively of the periphery of rotor 10 at the base of its blades 17 to provide a smooth substantially continuous portion of the inner wall of passage 16. Similarly the inner shroud sections 85 and 91 extend in juxtaposition with the upstream and downstream edges respectively of the periphery of rotor 11 at the base of the latter's blades 18 to complete the substantially continuous inner wall for the passage 16. The inner and outer ends of the nozzle blades 58 are shaped spherically about radii extending along the axes of their associated spindles 53 and centered at the intersection of these radii on the axis of the rotors 10 and 11. Correspondingly, at the regions of the blades 58, the juxtaposed portions of the outer shroud section 50 and inner shroud section 80, 85 are formed spherically about radii similarly centered. Thus upon pivotal adjusting movement of the blades 58, the clearance between their inner and outer edges and the adjacent inner and outer shroud sections will remain the same.

We claim:
1. In a gas turbine having first and second stage rotors, an annular passage for conducting motive gases to said rotors comprising inner and outer shrouds, a plurality of adjustable nozzles spaced circumferentially within said passage immediately upstream of said second stage rotor, means on said outer shroud adjustably supporting said nozzles, each nozzle having at its inner end a radially inwardly projecting stem, a ball element supported by each stem at a location spaced inwardly from the associated nozzle, said inner shroud including an inner section comprising a pair of annular parts spacing said rotors and having juxtaposed edges secured together at locations between successive ball elements to limit rotational movement of said inner shroud, said annular parts also having generally radially extending resilient flanges yieldingly engaging said ball elements at opposite sides thereof to support said inner shroud section.

2. In a gas turbine having first and second stage rotors, an annular passage for conducting motive gases to said rotors comprising inner and outer shrouds, a plurality of adjustable nozzles spaced circumferentially within said passage immediately upstream of said second stage rotor, means on said outer shroud adjustably supporting said nozzles, each nozzle having at its inner end a radially inwardly projecting stem, a ball element supported by each stem at a location spaced inwardly from the associated nozzle, said inner shroud including an inner section comprising a pair of annular parts coaxially spacing said rotors and carrying generally radially extending means secured together to connect said pair of parts at locations between successive ball elements and to limit rotational movement of said inner shroud, said annular parts also having generally radially extending resilient flanges yieldingly engaging said ball elements at opposite sides thereof to support said inner shroud section.

3. In a gas turbine having first and second stage rotors, an annular passage coaxial with said rotors for conducting motive gases thereto comprising inner and outer shrouds, a plurality of adjustable nozzles spaced circumferentially within said passage immediately upstream of said second stage rotor, means on said outer shroud adjustably supporting each nozzle for rotation about an axis transverse to the axis of said annular passage, each nozzle having a neck extending radially inwardly from its inner end coaxially with its axis of rotation, a ball element supported by each neck coaxially with said axis of rotation at a location radially inwardly from the associated nozzle, said inner shroud including a pair of annular inner shroud parts coaxial with said rotors and spacing the same and carrying inwardly extending means secured together at locations between said ball elements to connect said shroud parts and to limit rotational movement thereof, each inner shroud part also having one of each of a pair of inwardly extending resilient flanges associated with each ball element and yieldingly engaging opposite sides thereof to support said inner shroud parts, and a baffle closing the interior of one of said annular inner shroud parts to prevent axial flow of said motive gases therethrough.

4. In a gas turbine, a rotor, an annular passage comprising inner and outer shrouds for conducting motive gases to said rotor, a plurality of adjustable nozzles carried by said outer shroud and spaced circumferentially within said passage upstream of said rotor, each nozzle having a rounded element at its radially inner end, said inner shroud including an annular section upstream of said rotor, said section having resilient flanges associated with each rounded element and yieldingly engaging the same therebetween to support said section, and means carried by said section and spacing said rounded elements to limit rotation of said section.

5. In a gas turbine, a rotor, an annular passage comprising inner and outer shrouds for conducting motive gases to said rotor, a plurality of adjustable nozzles carried by said outer shroud and spaced circumferentially within said passage upstream of said rotor, a separate rounded element associated with one of each of a plurality of said nozzles, a stem spacing each rounded element from its associated nozzle and connecting the inner end of the latter with the associated rounded element, said inner shroud including an annular section upstream of said rotor, said section having resilient flanges associated with each rounded element and yieldingly engaging the same therebetween to support said section, and means carried by said section between said flanges and spacing said rounded elements to limit rotational movement of said section.

6. In a gas turbine, a rotor, an annular passage comprising inner and outer shrouds for conducting motive gases to said rotor, a plurality of adjustable nozzles carried by said outer shroud and spaced circumferentially within said passage upstream of said rotor, each nozzle being rotatably adjustable about an axis transverse to the axis of said annular passage, a separate rounded element associated with one of each of a plurality of said nozzles, a stem spacing each rounded element from its associated nozzle and connecting the inner end of the latter with the associated rounded element, each stem and rounded element being coaxial with the axis of rotatable adjustment of the associated nozzle, said inner shroud including an annular section upstream of said rotor, said section having resilient flanges associated with each rounded element and yieldingly engaging the same therebetween to support said section, and means carried by said section between said flanges and spacing said rounded elements to limit rotational movement of said section.

7. In a gas turbine, a rotor, an annular passage comprising iner and outer shrouds for conducting motive gases to said rotor, a plurality of adjustable nozzles carried by said outer shroud and spaced circumferentially within said passage upstream of said rotor, a separate ball element connected to the inner end of each of a plurality of said nozzles, said inner shroud including an annular section upstream of said rotor comprising two annular parts secured together in end-to-end arrangement at locations between said ball elements to limit rotation of said inner shroud, each of said parts having resilient flange portions extending transversely of the axis of said annular passage and yieldingly engaging axially opposite sides of each of said ball elements in a clamping action to support said section.

8. In a gas turbine, a rotor, an annular passage comprising inner and outer shrouds for conducting motive gases to said rotor, a plurality of adjustable nozzles carried by said outer shroud and spaced circumferentially within said passage upstream of said rotor, a separate ball element connected to the inner end of each of a plurality of said nozzles, said inner shroud including an annular section upstream of said rotor and comprising two annular parts having juxtaposed coaxial circular ends, one of said ends terminating in a plurality of circumferentially spaced inturned flanges, the other of said ends also terminating in a first plurality of circumferentially spaced inturned flanges in juxtaposition with alternate flanges of said one end and secured to the latter flanges at locations between said ball elements to limit rotation of said inner shroud, one of each of the remaining flanges of said one end resiliently engaging one axial side of one of each of said ball elements, the annular part having said other end also having a second plurality of circumferentially spaced inturned flanges offset axially from said first plurality of flanges, one of each of said second plurality of flanges resiliently engaging the axial side of one of each of said ball elements in opposition to the flanges of said one end which resiliently engage said ball elements, thereby to support said inner shroud section by the resilient engagement between said ball elements and flanges.

9. In a gas turbine, a rotor, an annular passage comprising inner and outer shrouds for conducting motive gases to said rotor, a plurality of adjustable nozzles carried by said outer shroud and spaced circumferentially within said passage upstream of said rotor, a separate ball element connected to the inner end of each of a plurality of said nozzles, said inner shroud including an annular section upstream of said rotor and comprising two annular parts having juxtaposed coaxial circular ends, one of said ends terminating in a plurality of circumferentially inturned flanges, the other of said ends also terminating in a first plurality of circumferentially spaced inturned flanges in juxtaposition with alternate flanges of said one end and secured to the latter flanges, one of each of the remaining flanges of said one end resiliently engaging one axial side of one of each of said ball elements, the annular part having said other end also having a second plurality of circumferentially spaced inturned flanges offset axially from said first plurality of flanges, one of each of said second plurality of flanges resiliently engaging the axial side of one of each of said ball elements in opposition to the flanges of said one end which resiliently engage said ball elements, thereby to support said inner shroud section by resilient engagement between said ball elements and flanges, one of said annular parts having a closed end to prevent axial passage of said motive gases through said annular section, and means carried by said annular section arranged to engage certain of said ball elements upon circumferential movement of said annular section to limit such movement and to maintain resilient engagement between said ball elements and flanges.

10. In a gas turbine having first and second stage rotors, an annular passage coaxial with said rotors for conducting motive gases thereto comprising inner and outer shrouds, a plurality of adjustable nozzles spaced circumferentially within said passage immediately upstream of said second stage rotor, means on said outer shroud adjustably supporting each nozzle for rotation about an axis transverse to the axis of said annular passage, each nozzle having a neck extending radially inwardly from its inner end coaxially with its axis of rotation, a ball element supported by each neck coaxially with said axis of rotation at a location radially inwardly from the associated nozzle, said inner shroud including a pair of annular inner shroud parts extending end-to-end coaxially with said rotors and spacing the same and carrying inwardly extending means secured together to connect said shroud parts at locations between said ball elements and to limit rotational movement of said inner shroud, each inner shroud part also having one of each of a pair of inwardly extending resilient flanges associated with each ball element and yieldingly engaging the associated ball element at opposite sides thereof to support said inner shroud parts, and a baffle at the upstream end of the upstream inner shroud part closing the interior thereof to prevent axial flow of said motive gases therethrough.

References Cited in the file of this patent

UNITED STATES PATENTS

| | | |
|---|---|---|
| 2,625,789 | Starkey | Jan. 20, 1953 |
| 2,912,824 | Van Nest | Nov. 17, 1959 |

FOREIGN PATENTS

| | | |
|---|---|---|
| 555,908 | Belgium | Mar. 15, 1957 |
| 561,070 | Canada | July 29, 1958 |

OTHER REFERENCES

U.S.N.A.C.A. Research Memorandum RME52G03 (1952).